United States Patent [19]

Diaz

[11] 4,318,220
[45] Mar. 9, 1982

[54] PROCESS FOR RECOVERING HEAT RECOVERABLE SHEET MATERIAL

[75] Inventor: Stephen H. Diaz, Los Altos, Calif.

[73] Assignee: Raychem Corporation, Menlo Park, Calif.

[21] Appl. No.: 121,522

[22] Filed: Feb. 14, 1980

Related U.S. Application Data

[60] Division of Ser. No. 31,468, Apr. 19, 1979, Pat. No. 4,223,209, which is a division of Ser. No. 775,882, Mar. 9, 1977, Pat. No. 4,177,446, which is a continuation-in-part of Ser. No. 638,440, Dec. 8, 1975, abandoned.

[51] Int. Cl.³ .............................................. H05B 3/00
[52] U.S. Cl. .................................. 29/611; 29/610 R
[58] Field of Search ................. 29/611, 879, 610, 612, 29/613; 174/DIG. 8; 338/22 R, 22 SD, 212, 314, 322, 206, 254; 219/541, 549; 361/24

[56] References Cited

U.S. PATENT DOCUMENTS

| | | | |
|---|---|---|---|
| 2,679,569 | 5/1954 | Hall | 338/308 X |
| 2,978,665 | 4/1961 | Vernet et al. | |
| 3,243,753 | 3/1966 | Kohler | |
| 3,294,941 | 12/1966 | Mullen | 174/DIG. 8 |
| 3,412,358 | 11/1968 | Hummel et al. | |
| 3,455,336 | 7/1969 | Ellis | 174/DIG. 8 |
| 3,683,361 | 8/1972 | Salzwedel | 29/611 X |
| 3,691,349 | 9/1972 | MacColl et al. | 219/549 |
| 3,731,378 | 5/1973 | Toma et al. | 29/879 |
| 3,758,353 | 9/1973 | Huriez | 174/DIG. 8 X |
| 3,793,716 | 2/1974 | Smith-Johannsen | |
| 3,823,217 | 7/1974 | Kampe | |
| 3,914,363 | 10/1975 | Bedard et al. | |
| 4,060,710 | 11/1977 | Reuter et al. | 29/611 X |
| 4,177,446 | 12/1979 | Diaz | |
| 4,223,209 | 9/1980 | Diaz | |

FOREIGN PATENT DOCUMENTS 1265194  3/1972  United Kingdom .

Primary Examiner—Francis S. Husar
Assistant Examiner—C. J. Arbes
Attorney, Agent, or Firm—Lyon & Lyon

[57] ABSTRACT

The invention relates to heating elements comprising conductive polymers which are capable of undergoing a change in dimension and their use to cause recovery of heat recoverable sheet material. The heating elements comprise a laminar member composed of a conductive polymer and two laminar electrodes connected directly or indirectly to opposite faces of the laminar member, and there are apertures, for example slits, passing through the thickness of the element so that at least one planar dimension of the element can be changed by changing the shape of the apertures. The apertures through the element facilitate its dimensional change. Preferably the laminar member exhibits PTC characteristics. The heating elements are particularly useful in the form of articles in which the element is attached to a heat-responsive sheet, for example a heat-recoverable polymeric film to cause recovery of the heat-responsive sheet.

4 Claims, 6 Drawing Figures

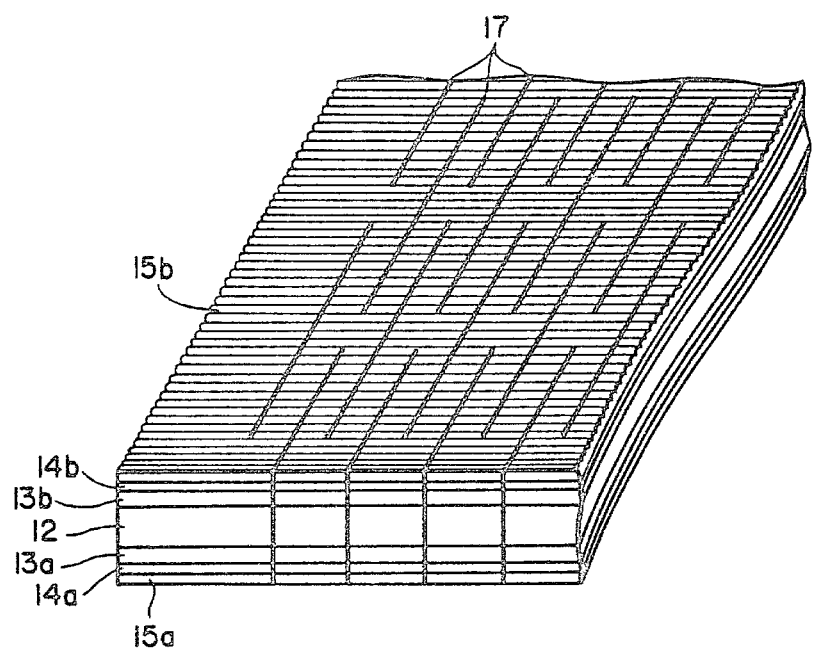
FIG_1
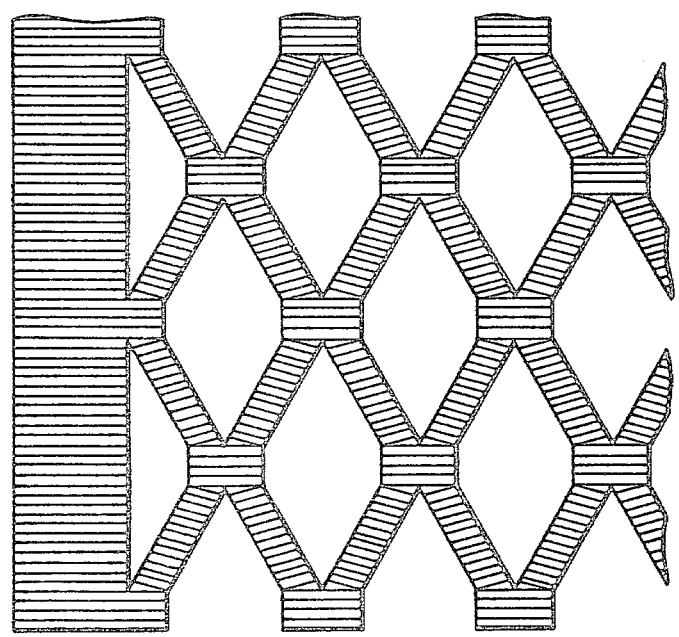
FIG_2

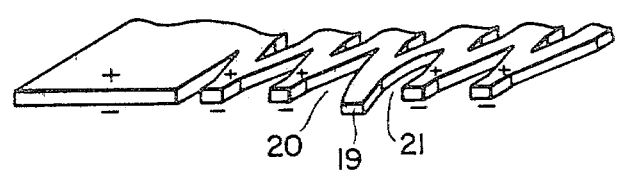
FIG_3
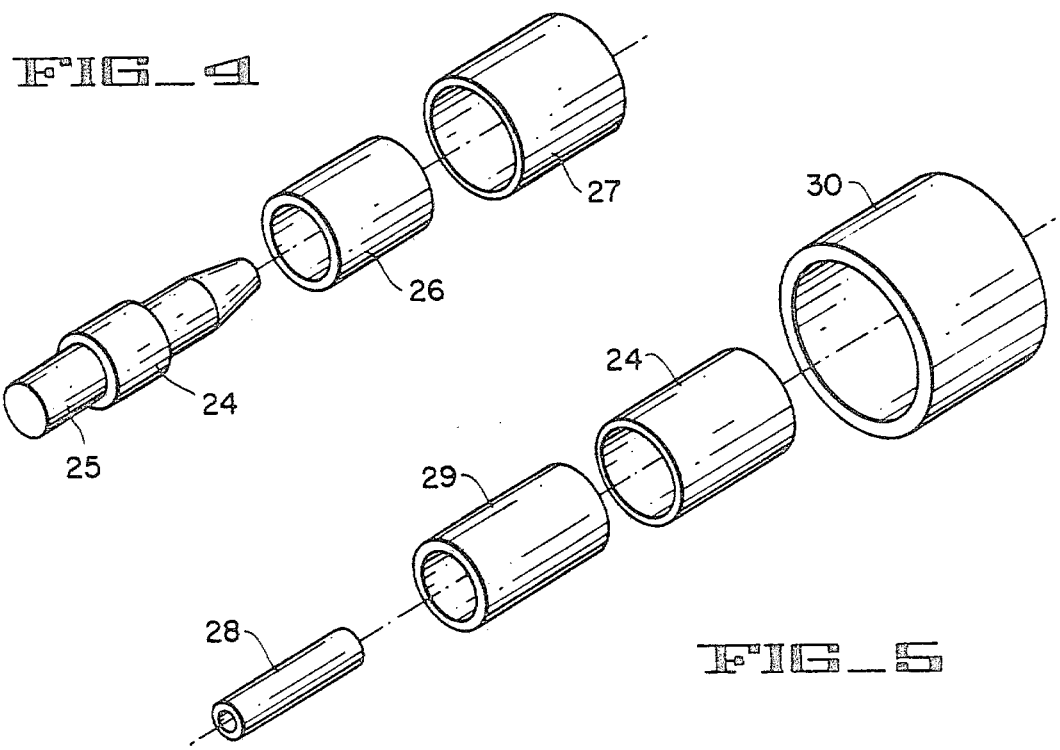
FIG_4
FIG_5
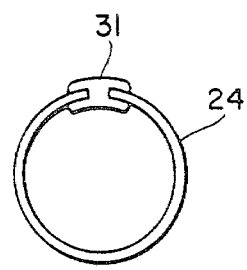
FIG_6

PROCESS FOR RECOVERING HEAT RECOVERABLE SHEET MATERIAL

CROSS REFERENCE TO RELATED APPLICATION

This application is a division of my copending application Ser. No. 31,468, filed Apr. 19, 1979, now U.S. Pat. No. 4,223,209, issued Sept. 16, 1980 which is a division of my application Ser. No. 775,882, filed Mar. 9, 1977 (now U.S. Pat. No. 4,177,446), which is a continuation-in-part of my application Ser. No. 638,440, filed Dec. 8, 1975 (now abandoned).

BACKGROUND OF THE INVENTION

1. Field of the Invention.

This invention relates to heating elements comprising conductive polymers.

2. Description of the Prior Art.

It is well known that polymers can be made electrically conductive by dispersing therein suitable amounts of finely divided conductive fillers. It is also well known that certain polymeric articles can be rendered heat-recoverable. It has been proposed (see British Pat. No. 1,265,194) to make a heat-recoverable article comprising a first heat-recoverable member composed of a conductive polymer and a second heat-recoverable member which is not electrically conductive, and to cause such an article to recover by passing an electric current through the first member. However, such articles suffer from certain disadvantages. In particular the electrical characteristics of the conductive polymer member are liable to change excessively if any of the dimensions of the member are changed by more than 30%, which is less than is generally desirable for heat-recoverable articles. Furthermore, the presence of the conductive polymer layer increases the force needed to deform the article and can adversely affect recovery. It has also been found that if the current is passed from end to end of the conductive polymer member, as suggested by British Pat. No. 1,265,194, the member is often not heated as uniformly as is desirable to achieve satisfactory shrinkage and to avoid local overheating.

SUMMARY OF THE INVENTION

I have now discovered that if a laminar conductive polymer member is sandwiched between a pair of laminar flexible electrodes, and suitable apertures are formed in the resulting laminate, it is possible to obtain an easily expandable and/or contractable product having greatly improved electrical characteristics.

DETAILED DESCRIPTION OF THE INVENTION

Thus in its first aspect, the invention provides a heating element which comprises:

(A) a laminar member composed of a material which comprises an organic polymer and electrically conductive particles dispersed in the polymer in amount sufficient to render the member electrically conductive; and (B) a pair of laminar flexible electrodes which (i) are connected (directly or indirectly) to opposite faces of said laminar member; (ii) are substantially coplanar with said laminar member; and (iii) are adapted to be connected to an external source of power to cause current to pass through said laminar member; said laminar member and laminar electrodes having a plurality of apertures through the thickness thereof, the apertures being of a size, shape and distribution which permit at least one of the dimensions of the element in the plane thereof to be changed by a change in the shape of the apertures. Preferably at least one of the planar dimensions of the element can be changed at the melting point of the polymer (and preferably at some lower temperature, e.g. 25° or 50° C.) by a percentage which is at least 30%, without complete rupture of the electrode at any point, the dimensional change being accommodated by a change in the shape of the apertures. It is to be understood that the said dimensional change may be an increase as a result of stretching, or a decrease as a result of compression, or both (i.e. an element which can be stretched by X% and compressed by Y% in the same dimension, where $X+Y$ is at least 30).

The term "without complete rupture of the electrode at any point" means that each electrode maintains an electrical pathway completely surrounding each aperture; thus the electrode may tear partially but not completely at any point. The "melting point of the polymer" referred to above is for crystalline thermoplastic polymers the temperature at which melting of crystalline material begins, and for other polymers, e.g. elastomers and non-crystalline thermoplastic polymers, is the softening point of the polymer.

These novel heating elements are useful in situations in which it is desirable to have a heater which can readily change at least one of its planar dimensions without excessive change in its electrical characteristics. Preferably the element is deformable as set out above by a said percentage which is at least 50%, e.g. at least 70%, especially at least 100%, and for some purposes at least 250%. I have surprisingly found that even when the element is deformed by a high percentage, its resistance does not generally increase by more than 20%, which is very valuable.

As indicated above, the apertures are preferably capable of changing in shape so as to accommodate a change in a planar dimension of at least 30% (or preferably a greater percentage as set out above), but it is to be understood that at greater percentage changes, the possibility of some stretching or contraction of the element material itself is not excluded.

The term "apertures" is used herein to include slits which open up into, for example, diamond-shaped openings when the element is extended. In general it will be convenient for the apertures in the undeformed element to be such that substantial planar deformation of the element is possible only by stretching, i.e. the element is expandable, and the invention will be chiefly so described. However, the invention includes, for example, elements which in the undeformed state are expandable or contractable in one direction, and elements having apertures such that the element can be stretched simultaneously in two directions.

The choice of apertures will be dependent on the degree of expandability required and the ductility of the electrodes and member A. The apertures must be elongated and must overlap each other, but a wide variety of apertures fulfilling these requirements can be used. Thus the apertures may be regular or irregular and may for example be straight or wave-form slits or slots, oval holes or diamond-shaped holes. It will generally be convenient that the apertures should be regularly spaced and of the same size and shape. It is generally desirable that the apertures should be such that the element responds symmetrically through the thickness thereof to extensions in the plane of the element, in order to avoid buckling of the element. I have obtained good results with elements in which the distance between the edges of adjacent apertures is 1/10 to ½ inch (0.25 to 1.25 cm). Preferably the apertures are a plurality of identical straight slits in parallel equally-spaced rows with the slits in adjacent rows overlapping each other; the length of the slits are preferably at least ½ inch (1.25 cm) long, especially 5 to 20 times the distance between adjacent rows of slits. Elements which can be stretched to at least three times their original length can be obtained in this way.

In a preferred embodiment, Member A is composed of a material which is one of the small proportion of the conductive polymers which exhibits what is known as PTC (positive temperature coefficient) behavior, i.e. a rapid increase in resistivity at a particular temperature or over a particular temperature range. The term "switching temperature" (usually abbreviated to $T_s$) is used to denote the temperature at which the rapid increase takes place. When the increase takes place over a temperature range (as is often the case) then $T_s$ can conveniently be designated as the temperature at which extensions of the substantially straight portions of the plot of the log of the resistance against the temperature (above and below the range) cross.

PTC materials used in member A will generally have a $T_s$ above 50° C., often above 100° C.

It is also desirable that the increase in resistance above $T_s$ should be sufficiently high that member A is effectively converted from an electrical conductor to an electrical insulator by a relatively limited increase in temperature. A convenient expression of this requirement is that the material should have an $R_{14}$ value of at least 2.5 or an $R_{100}$ value of at least 10, and preferably an $R_{30}$ value of at least 6, where $R_{14}$ is the ratio of the resistivities at the end and beginning of the 14° C. range showing the sharpest increase in resistivity; $R_{100}$ is the ratio of the resistivities at the end and beginning of the 100° C. range showing the sharpest increase in resistivity; and $R_{30}$ is the ratio of the resistivities at the end and beginning of the 30° C. range showing the sharpest increase in resistivity.

For a general survey of conductive polymers, reference may be made to "Conductive Rubbers and Plastics" by R. H. Norman, published in 1970 by Elsevier Publishing Company. PTC compositions are disclosed in Polymer Engineering and Science, November 1973, 13 No. 6, pages 462–468, and U.S. Pat. Nos. 2,978,665; 3,243,753; 3,412,358; 3,591,526; 3,793,716; 3,823,217; and 3,914,363, the disclosures of which are hereby incorporated by reference. For details of recent developments in this field, reference may be made to the following patent applications all filed Aug. 4, 1975: Horsma et al, Ser. No. 601,638; Whitney and Horsma, Ser. No. 601,427 (now U.S. Pat. No. 4,017,715); Horsma and Hammack, Ser. No. 601,639; Moyer, Ser. No. 601,424 (now abandoned); Horsma and Diaz, Ser. No. 601,549 (now abandoned); Horsma and Diaz, Ser. No. 601,344 (now U.S. Pat. No. 4,085,286), the disclosures of which are incorporated herein by reference.

The use of a PTC material for member A prevents the member from being electrically heated to a temperature above its $T_s$. The $T_s$ of PTC materials is usually very much dependent upon the tensile stress thereof, and in the absence of the performations, the $T_s$ of member A would alter considerably when its planar dimensions were changed. However, I have found that, although parts of member A are under considerable stress, the overall $T_s$ of member A is not substantially changed by expansion or contraction.

The resistivity of the laminar member A should be sufficient to provide adequate heating in the operating range of the element. In the case of materials which do not exhibit PTC characteristics, a resistivity of at least 10 ohm.cm at room temperature is generally necessary. With PTC materials, however, the increase in resistivity as the temperature rises can be sufficient to permit the use of materials whose room temperature resistivity is relatively low, e.g. 1 to 10 ohm.cm. Particularly is this so when the resistivity of the electrodes or of other layers in the element is such as to provide additional heating.

The electrodes may be of any suitable material, for example of metal or a highly conductive polymer, and may comprise bussing sections which do not contain apertures and which run at right angles to the direction of major dimensional change. Metals are generally preferred because they have high conductivity coupled with elongations which are generally high enough for most uses; metals having a ductility at least as high as aluminium are preferred. The tendency of metal foil electrodes to tear can be decreased (and at the same time flexibility increased) by corrugating the foil, for example by an amount which shortens it by about 15%. Suitable metals include copper, lead and aluminium.

One of the problems which I have found can arise, especially when using metal electrodes and/or when the apertures are diamond-shaped, is that short circuits can occur between the electrodes of opposite polarity if the element is locally distorted from a generally planar configuration, especially at the edges of the element, or if the element is partially broken. This problem can be alleviated by coating the exposed surfaces of the electrodes with an insulating material, for example a polymer, especially a cross-linked polymer, which has a softening temperature above the highest temperature likely to be reached by the electrode. It is desirable that the edges as well as the planar surfaces of the electrodes should be coated, and slit apertures should therefore preferably be opened out by expanding the element prior to coating. Suitable coating techniques include electroplating, electrostatic spraying, and dipping into a suitable powdered insulator, followed by curing of the coating by heat. An alternative way of reducing the likelihood of shorting is to use apertures such as slots or ovals which have substantial width even when the element is completely contracted. Another solution is to use two coextensive electrodes which are composed of conductive polymer and which are therefore less likely to short than a metal electrode, and if necessary or desirable to provide satisfactory electrical characteristics by the use of additional metal electrodes which do not overlap; such an arrangement also gives rise to changed electrical characteristics because of non-uniform current flow.

Generally speaking the electrodes will be coextensive with member A. However, this is not essential provided that in use current is passed through substantially the whole of the member A so as to provide satisfactory heating thereof.

Particularly useful heating elements are those in which member A exhibits PTC characteristics and which also comprise at least one intermediate layer which (a) exhibits constant wattage behavior (as hereinafter defined) at temperatures below the $T_s$ of member A; (b) is composed of a material which comprises an organic polymer and electrically conductive particles dispersed in the polymer in amount sufficient to render the member electrically conductive; (c) has a resistivity greater than 10 ohm.cm; and (d) is interposed between the member A and an electrode. Preferably there is one such intermediate layer either side of member A. The term "constant wattage behavior" means that the layer undergoes an increase in resistance of less than six-fold in any 30° C. range below the $T_s$ of member A and preferably between room temperature and $T_s$ of the member A.

It is preferred that the constant wattage layers have resistivities at room temperature which are higher than the resistivity of member A, so that they help to control the level of current inrush when the heating element is initially connected to a power supply. It is also preferred that the intermediate layers should exhibit PTC behavior at temperatures above the $T_s$ of member A, i.e. with a higher $T_s$. This is useful in preventing the overheating of the intermediate layer which would otherwise take place if the electrode was completely ruptured at any point, thus causing current to pass through the intermediate layer to bridge the rupture; this can cause severe overheating if the intermediate layer does not shut itself off at some suitable temperature.

The conductive particles in member A and any intermediate layers are preferably of carbon black, particularly when PTC characteristics are needed. In electrode layers comprising conductive polymers, the conductive particles may be preferably of carbon black or a metal. The particles may be of any shape, including fibres. Examples of suitable compositions are to be found in the prior publications and patent applications referred to above. The PTC compositions are preferably based on crystalline polymers, which compositions have a $T_s$ at or near the crystalline melting point of the polymer, which may be cross-linked to give the composition improved stability above $T_s$. A preferred composition for member A is a mixture comprising high density polyethylene (45% by weight) an ethylene-propylene rubber (5% by weight) and carbon black (50% by weight), which has a $T_s$ of about 120° C. A preferred composition for a constant wattage intermediate layer comprises an ethylene/vinyl acetate copolymer (61% by weight) and carbon black (39% by weight).

In formulating the compositions for the different layers, it is, of course, necessary to consider the physical, as well as the electrical, properties thereof, for example flexibility, adhesion to adjacent layers and resistance to flow at operating temperatures. Having regard to the disclosure herein, the selection of suitable compositions will present no difficulties to those skilled in the art. Preferably the element is of symmetrical construction.

The novel heating elements can be prepared by assembling the various layers; bonding them together with the aid of heat and pressure; and then creating the apertures in the bonded assembly. Suitable conductive adhesives, e.g. carbon-loaded hot melt adhesives, can be placed between the layers, especially between metal electrodes and adjacent polymeric layers, to ensure adequate adhesion between the layers. A suitable adhesive comprises about 65% by weight of an ethylene/acrylic acid copolymer and about 35% carbon.

When it is desired that the polymer in member A and in any other polymeric layers should be cross-linked, as may be preferred, the polymers initially employed must, of course be cross-linkable. Cross-linking is preferably carried out after the bonding step but before the apertures are created, for example by use of ionising radiation of sufficient dosage, e.g. 5 to 20 megarads. Alternatively a chemical cross-linking agent can be incorporated in the polymers, and cross-linking effected during the bonding step, or in a separate heating step after the bonding step but before the apertures are created.

Slits are in general easier to create in the element than openings such as slots or ovals. Slits can be simply cut by means of a sharp blade, for example a plurality of blades operating in staggered formation so that in effect the slits are made one row at a time; a stripper pad may be used to prevent the blade from tearing the element as it is withdrawn. Openings, on the other hand, must be punched out.

The novel heating elements are particularly useful as components of articles which comprise a heat-responsive (as hereinafter defined) sheet material and adjacent to one face of the sheet material a heating element as defined above. The heating element may be in direct contact with the sheet material, for example secured thereto by an adhesive, or may be separated therefrom by an intermediate layer provided that there is adequate heat transfer between the heating element and the sheet material. The article is preferably flexible, at least at the temperature at which the sheet material becomes responsive.

The term "heat-responsive" is used herein to mean that when the sheet material is heated to a suitable temperature in either (a) undergoes a spontaneous change in at least one dimension in the plane thereof; and/or (b) undergoes some othe change, e.g. it softens (including flows), which substantially reduces the external forces (e.g. manual forces) required to change at least one dimension of the sheet material in the plane thereof. The sheet material preferably comprises an organic polymer, for example a polymeric film which is heat-recoverable or can be rendered heat-recoverable, an adhesive (for example a hot-melt or heat-activatable adhesive) or a mastic.

It will, of course, be apparent that in such articles the heating element should be placed adjacent the sheet material in such a way that it is capable of changing its dimensions in the required way when the article is heated.

The articles of the invention will generally have one heater element and one sheet material, but may contain more than one element and/or more than one sheet material; for example they may comprise an element sandwiched between two sheet materials or one sheet material sandwiched between two elements.

When the sheet material is a polymeric film which is heat-recoverable or can be rendered heat-recoverable, it preferably comprises a crystalline cross-linked polymer. Suitable polymers for heat-recoverable sheet materials are well known in the art, see for example U.S. Pat. No. 3,086,242, the disclosure of which is hereby incorporated by reference, and include polymers of one or more olefins and/or one or more ethylenically unsaturated monomers containing polar groups.

Articles comprising a heat-recoverable polymeric film can be made by deforming an article which comprises (a) a film which can be rendered heat-recoverable and (b), attached to one face of the film, a heating element (preferably one which has not been substantially deformed in the plane thereof), the deformation being carried out at a temperature above the crystalline melting point of the polymer in the sheet material, followed by cooling the article while it is in the deformed state. Suitable techniques are well known in the art (see for example U.S. Pat. No. 3,086,242). Such articles can also be made by assembling a heat-recoverable sheet material and a heating element, preferably one that has been deformed in the plane thereof in the direction opposite to the direction of heat recovery of the sheet material.

As noted above, the sheet material will generally be secured to the heating element by means of an adhesive. The adhesive need not be a very powerful one since the dimensions of the heating element are easily changed. This is an important advantage over similar articles comprising a heating element without apertures, which generally require a powerful adhesive to ensure that the element satisfactorily follows dimensional change of the sheet material. The adhesive is preferably one which at the operating temperature, e.g. the recovery temperature of the article, permits slippage between the heating element and the sheet material, but does not flow into the aperture of the heating element and thus interfere with dimensional change thereof. Suitable adhesives are, for example, included in the disclosure of British Specification No. 1,440,810, and other adhesives containing labile ionic bonds. Preferably the adhesive is one whose Vicat melting point is below the operating temperature and whose ring and ball softening point is below the operating temperature. Particuarly preferred adhesives are thixotropic at the operating temperature, e.g. the recovery temperature.

The sheet material and heating element can, for example, be secured to each other by assembling them with a layer of a suitable hot melt or heat-activatable adhesive between them, and heating the assembly under pressure, e.g. from a pair of rollers. If the sheet material has been rendered heat-recoverable prior to assembly and preparation of the assembly involves use of a temperature above the recovery temperature, then steps must be taken to prevent complete recovery of the sheet material.

When the heating element provides one face of the article, it may be desirable that at least some of the apertures therein contain a composition which flows at the operating temperature of the article, for example a solder or a mastic or a hot melt adhesive. This is particularly useful when the article is heat-recoverable, for example a heat-shrinkable sleeve having the heating element on the inside, and recovery of the article brings the heating element into contact with a substrate to be covered and thus causes the composition to be squeezed from the apertures. Presence of the composition can also improve heat transfer from the heater to the sheet material.

The articles of the invention may be of any suitable shape, and can be part of a larger object. Thus the invention includes objects having one or more sections which are articles according to the invention. Particular useful articles are sleeves, i.e. hollow articles of closed cross-section having at least one open end, e.g. tubular articles of circular or other cross-section, especially such sleeves which contract to a smaller diameter on heating. When the heater element is on the inside, such sleeves can conveniently be made by expanding a heating element sleeve by placing it over a mandrel; surrounding the exterior of the element with a suitable adhesive (e.g. a preformed tube thereof); surrounding the exterior of the adhesive with a sleeve of sheet material which is heat-shrinkable to a diameter less than the external diameter of the element; heating the assembly to cause the sleeve to shrink down and bond to the element via the adhesive; cooling the assembly; and removing the mandrel. When the heating element is on the outside, such sleeves can conveniently be made by assembling a potentially heat-recoverable sleeve inside a heating element with an intermediate layer of adhesive; heating the assembly and pneumatically expanding it against an external die; and cooling the assembly while maintaining the assembly in expanded condition.

A tubular heating element can conveniently be made by joining opposite edges of a sheet material through a strip of insulating material, e.g. of an organic polymer, to which the edges can be bonded by a sutable adhesive.

A particularly valuable use of the heating elements of the invention is in the novel splice cases descirbed in copending Application of Diaz, Ser. No. 638,687 filed Dec. 8, 1975 (now abandoned), the disclosure of which is hereby incorporated by reference.

The invention includes processes in which an article is prepared by connecting the electrodes of an article as defined above to an external source of power which causes current to pass through the laminar member A and to provide at least part of the heat needed to heat the sheet material to a temperature at which it becomes responsive; and allowing or forcing the sheet material at said temperature to undergo dimensional change in the plane thereof. The process is particularly useful when a substrate is covered by positioning the article adjacent to the substrate and connecting the electrodes so that the heated sheet material undergoes dimensional change such that the article conforms to the surface of the substrate. If desired the article can surround the substrate or can cooperate with another covering member to surround the substrate. The external source of power in these processes is conveniently DC of about 12 volts from a battery or AC of about 115 or about 220 volts from a mains source. It may be desirable to continue heating the article (by continuing to pass current through the heating element or otherwise) after the planar dimensions thereof have changed, for example to heat a substrate brought into contact therewith to ensure adequate adhesion between the article and the substrate, by a heat-activatable adhesive or otherwise.

BRIEF DESCRIPTION OF THE DRAWINGS

FIG. 1 is an isometric view of a part of a heating element according to the invention, prior to expansion.

FIG. 2 is a plan view of a part of the heating element of FIG. 1 after it has been expanded.

FIG. 3 is a perspective view of an edge portion of the expanded heating element of FIG. 2 which has been locally distorted.

FIG. 4 illustrates a method of installing a cylindrical heating element into a heat shrinkable sleeve.

FIG. 5 illustrates a method of installing a cylindrical heating element over a heat shrinkable sleeve.

FIG. 6 is an end view of a cylindrical heating element according to the present invention.

Referring now to the drawings, FIG. 1 is an isometric view of a part of a heating element of the invention. The element comprises a layer 12 composed of a conductive polymer which exhibits PTC behavior. Adherent to layer 12 are constant wattage layers 13a and 13b which are composed of a conductive polymer and preferably exhibit PTC behavior with a $T_s$ higher than layer 12. Layer 13a and 13b are secured to corrugated metal foil layers 15a and 15b via layers of adhesive 14a and 14b. There are a plurality of slits formed in parallel staggered rows 17. The slits will generally be somewhat longer than is shown in the drawings. The edge portions of the sheet parallel to the perforations do not contain perforations. When these edge portions are separated, the apertures become diamond-shaped, as illustrated in FIG. 2.

FIG. 3 illustrates how the problem of short-circuiting referred to above can arise. When edge portion 19 is displaced, short circuits can occur across the spaces 20 and 21 between the oppositely-charged electrodes as the element contracts. When this problem arises it can be cured by one of the solutions referred to previously.

FIG. 4 illustrates the installation of a heating element on the inside of the heat shrinkable sleeve. Tubular member 24 represents an expanded cylindrical heating element positioned over a mandrel 25. The mandrel can be used to expand the element to its desired diameter. Member 26 is a tubular layer of adhesive and member 27 is a sleeve of heat recoverable material having a larger diameter than the final heat recoverable diameter desired. Members 26 and 27 are concentrically arranged over heater 24 and mandrel 25 and the assembly heated, for example, in an oven, to shrink the sleeve 27 and activate the adhesive. In shrinking, the sleeve 27 provides the pressure for a secure bond between it and the heating element. The assembly is then cooled and the mandrel 25 removed. When subsequently heated by means of heating element 24, the sleeve can continue to shrink to its heat stable diameter or into contact with a substrate.

FIG. 5 illustrates the installation of a heating element on the outside of a heat shrinkable tube. Sleeve 28 is a tube of polymer capable of being rendered heat recoverable. Members 29 and 24 are, respectively, a tubular adhesive layer and the heating element to be joined to sleeve 28. Member 30 is a pneumatic expansion die. The various elements are concentrically arranged and tube 28 heated and pneumatically expanded to render it heat recoverable. In the process of expansion, the heat can activate adhesive layer 29 to form a bond with heating element 24. Expansion is limited by die 30. When the assembly is cool, pneumatic pressurization of sleeve 28 is terminated and die 31 removed from the assembly.

FIG. 6 illustrates a cylindrical heating element 24 that can be employed in the process of FIGS. 4 and 5. As shown, the ends are joined by means of an "I" beam member 31, preferably a polymeric member, that insulates the ends from each other to prevent short circuits. The "I" beam member is preferably bonded to the heater by a suitable adhesive.

The invention is further illustrated by the following Example in which the percentages are by weight.

EXAMPLE

Laminar members of the compositions and thicknesses shown were assembled in the order shown:
(1) Lead; 4 mils (0.01 cm) thick.
(2) A mixture of an ethylene/acrylic acid copolymer (65%) and carbon black (35%); 5 mils (0.0125 cm) thick.
(3) A mixture of an ethylene/vinyl acetate copolymer (61%) and carbon black (39%); 10 mils (0.025 cm) thick.
(4) A mixture of high density polyethylene (45%), an ethylene/propylene rubber (5%) and carbon black (50%); 20 mils (0.051 cm) thick.
(5) as laminar member (3).
(6) as laminar member (2).
(7) as laminar member (1).

These layers were bonded together with heat and pressure and then exposed to 6 megarads of ionising radiation. expandable heating element was made by creating in the bonded assembly slits 0.5 inch (1.25 cm) long in parallel but offset rows 0.025 inch (0.06 cm) apart; the slits in a row were spaced apart 0.10 inch (0.25 cm). A heat-recoverable polymeric sheet was obtained as follows. A sheet 0.08 inch (0.2 cm) thick was extruded from a mixture of an ethylene/ethyl acrylate copolymer (88.4%) (DPD 6181 from Union Carbide), a dispersion of 1 part of carbon black in 3 parts of an ethylene/vinyl acetate copolymer (9%) (Colorant CC 004), finely divided silica (3) (Cabosil) and an antioxidant (0.6%); the sheet was crosslinked with 12 megarads radiation; a sample 10×4 inch (25×10 cm) was cut from the sheet, stretched to 20 inch (50 cm), and held there until cool. A section of a heating element prepared as described above and about 10×4 inch (25×10 cm) was connected to a 24 volt power source and allowed to heat, and was then stretched to 20 inch (50 cm). The heating element while hot was bonded to the samle of the heat-recoverable sheet by means of a 5 mil (0.0125 cm) thick layer of an adhesive that would soften but not flow at about 100° C. The heat produced by the heater softened the adhesive and by application of pressure the heater was fused to the recoverable sheet. The recoverable sheet was restrained to prevent its recovery. The resulting article was allowed to cool to room temperature and the restraint on the heat-recoverable member removed. The heater was then connected to a 24 volt power source. The heat-recoverable member and heating element recovered to their original dimensions within 2 min. The heater reached its control temperature of about 115° C. in about 1 min. Shrinkage of the heat-recoverable member and heater occurred smoothly.

I claim:
1. A process for preparing an article which comprises:
(1) connecting an external source of electric power to a pair of electrodes of an article which comprises a heat-recoverable sheet material and adjacent and secured to one face of the sheet material a heating element which comprises:
(A) A laminar member composed of a material which comprises an organic polymer and electrically conductive particles dispersed in the polymer in amount sufficient to render the member electrically conductive; and
(B) a pair of laminar flexible electrodes which (i) are connected to opposite faces of said laminar member; (ii) are in a plane substantially parallel with said laminar member; and (iii) are connected to said external source of power to cause current to pass through said laminar member;
said laminar member and laminar electrodes having a plurality of apertures through the thickness thereof, the aperturs being of elongated closed cross-section and overlapping one another to permit at least one of the dimensions of the heating element in the plane thereof to be changed by a change in the shape of the apertures;

(2) passing current through said heating element until said sheet has been heated to a temperature at which it becomes responsive; thereby causing a change in the dimensions of said heating element and said sheet material at said temperature.

2. A process according to claim 1 wherein said article is positioned adjacent a substrate and said dimensional change causes the article to conform to the surface of the substrate.

3. A process according to claim 2 wherein said article surrounds the substrate.

4. A process according to claim 3 wherein said article cooperates with another covering member to surround the substrate.

* * * * *